H. M. PATCH.
DIFFERENTIAL POWER TRANSMISSION DEVICE.
APPLICATION FILED FEB. 18, 1918.
1,283,283.
Patented Oct. 29, 1918.
2 SHEETS—SHEET 2.
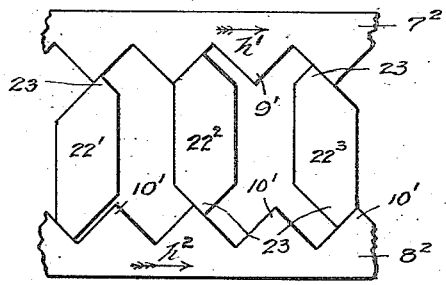
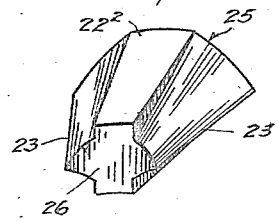
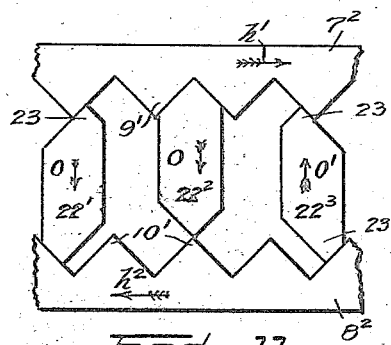
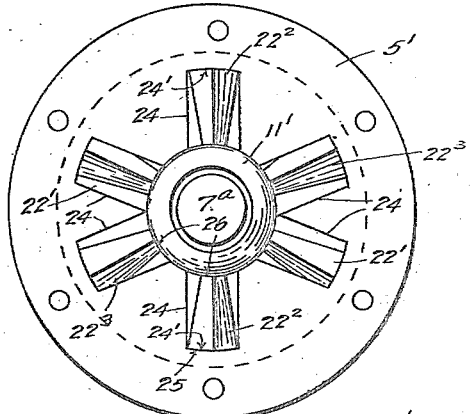
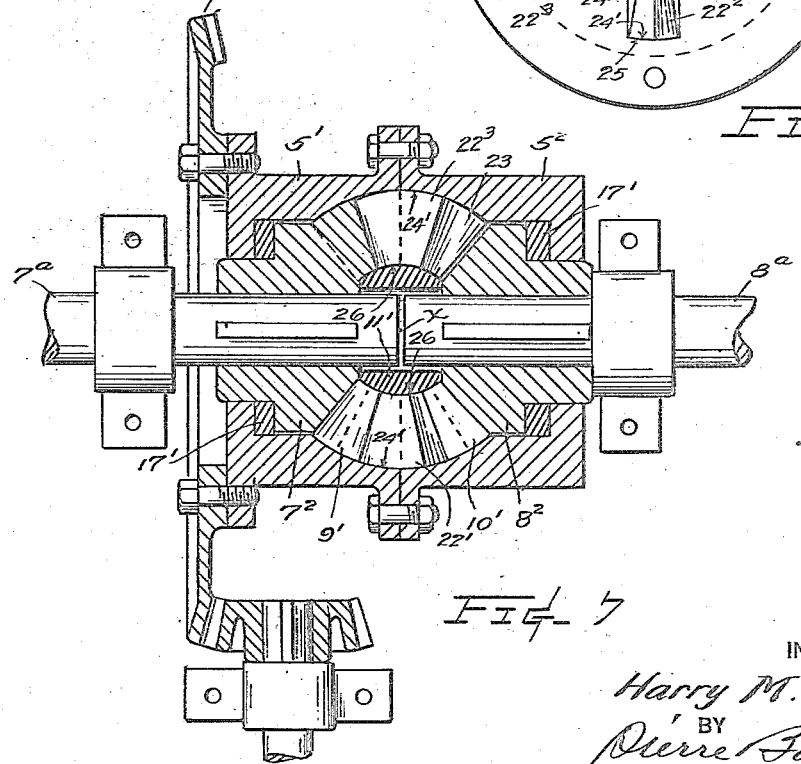
INVENTOR:
Harry M. Patch
BY
Pierre Barnes
ATTORNEY

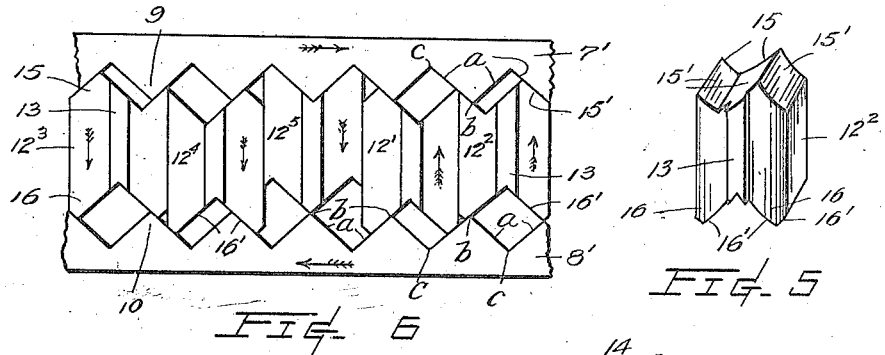
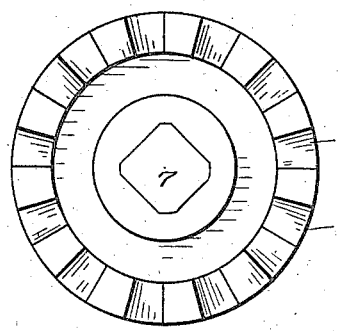
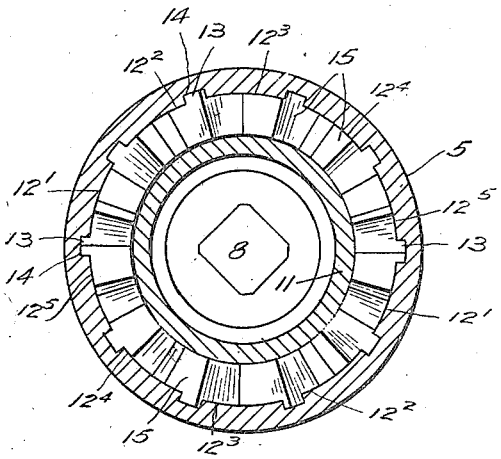
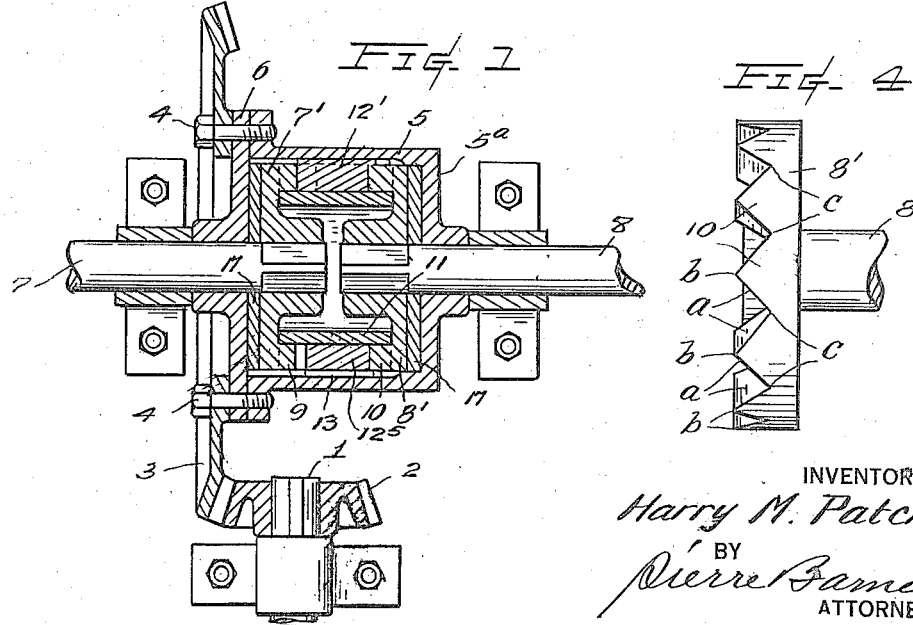

UNITED STATES PATENT OFFICE.

HARRY M. PATCH, OF SEATTLE, WASHINGTON.

DIFFERENTIAL POWER-TRANSMISSION DEVICE.

1,283,283.　　　　　Specification of Letters Patent.　　Patented Oct. 29, 1918.

Application filed February 18, 1918.　Serial No. 217,960.

*To all whom it may concern:*

Be it known that I, HARRY M. PATCH, a citizen of the United States, residing at Seattle, in the county of King and State of Washington, have invented certain new and useful Improvements in Differential Power-Transmission Devices, of which the following is a specification.

This invention relates to differential power transmission devices and, more particularly, to that type illustrated and described in U. S. Patent No. 1,242,587, issued to me October 9, 1917.

The object of the present invention is the perfecting of such devices to render the same more simple and durable in construction and to increase its efficiency.

These ends are attained by the provision of a plurality of power transmission blocks arranged circumferentially about the axis of the driving and driven members of the differential mechanism and interposed between said driven members for simultaneous revoluble movements and individual longitudinal movements.

The invention further consists in the novel construction, adaptation and combination of parts, as will be hereinafter described and claimed.

In the accompanying drawings, Figure 1 is a longitudinal sectional elevation of one embodiment of my invention; Fig. 2 is an end elevation of one of the driven members thereof; Fig. 3 is a transverse sectional view through Fig. 1; Fig. 4 is a side elevational view of one of the driven members of the device; Fig. 5 is a perspective view of one of the power-transmitting elements; and Fig. 6 is a diagrammatic view to illustrate the operation of the invention embodied in the preceding views. Fig. 7 is a longitudinal sectional elevation of another embodiment of my invention; Fig. 8 is an end elevation of the apparatus shown in Fig. 7 with one of the casing members and parts associated therewith removed; Fig. 9 is a perspective view of a power-transmission unit of the type shown in Figs. 7 and 8; and Figs. 10 and 11 are diagrammatic views illustrating various relative positions of the above mentioned units and driven elements shown in Figs. 7 and 8.

In said drawings, the reference numeral 1 designates the driving shaft of an automobile and having mounted thereon a bevel pinion 2, said pinion meshing with a bevel gear 3 which is rigidly secured, as by bolts 4, to a cylindrical casing 5. As shown in Fig. 1, this casing is provided with a removable end or head 6 to afford access to the operative parts within the casing.

7 and 8 represent alined axle parts respectively journaled in the cylinder ends $5^a$ and 6.

Provided within the casing and rigidly secured to or made integral with the respective axle parts are heads or gear wheels $7^1$ and $8^1$ formed with contrate teeth 9 and 10 which protrude inwardly with respect to the casing.

Referring now to the embodiment of my invention shown in Figs. 1 to 5, inclusive, of the drawings, 11 represents a tubular support positioned between the axle heads $7^1$ and $8^1$ to maintain the same in spaced relation and against thrust plates 17 which are interposed between said heads and the adjacent ends of the casing. The teeth of said heads are of angular shape formed with warped side surfaces $a$ (Figs. 4 and 6) extending between the respective tooth points $b$ and the apices $c$ of the reëntrant angles between the adjacent teeth. Said points and apices are, moreover, disposed in radial relations to the axle axis.

Arranged circumferentially about said support between the heads $7^1$ and $8^1$ and concentric to the axle axis, is a plurality of power transmission blocks $12^1$, $12^2$, $12^3$, etc., arranged for reciprocatory movement parallel to the axle axis by means such as a longitudinal rib 13 provided on each block engaging in a correspondingly disposed way 14 provided in the peripheral wall of the casing.

Said blocks are formed to provide at their ends teeth 15 and 16 of angular formation with side surfaces $15^1$ and $16^1$ adapted to register with the opposing teeth 9 and 10, respectively, of the aforesaid heads.

The number of said blocks should, however, be of a number differing from the number of teeth in the respective heads, the block teeth being dissimilarly disposed in the various blocks to cause the same to be reciprocated out of unison with each other for the purposes of better distributing the strains and obviating any danger of becoming unduly engaged with the heads.

In the embodiment of the invention shown in Figs. 7, 8 and 9, the casing is illustrated as being formed of two rigidly coupled complementary sections 5¹ and 5² inclosing heads 7² and 8² provided, like the aforedescribed embodiment, with angular shaped contrate teeth designated by 9¹ and 10¹ but which, in this instance, are disposed in bevel relation with the points and apices converging toward a point (indicated by $x$, Fig. 7) located in the axis of axle parts 7ª and 8ª and medially of the referred-to heads.

Power transmission blocks 22¹, 22², 22³ are provided circumferentially about the axle axis and intermediate the heads 7² and 8², said blocks having their ends formed to provide angularly shaped beveled teeth 23 adapted to register with the teeth of the heads. The blocks shown in the example are connected with the casing for rotary motion by being inserted in longitudinal slots 24 provided in the casing.

The outer and inner surfaces 25 and 26, respectively, of the referred to blocks, are curved longitudinally thereof to slidably fit against curved outer surfaces 24¹ of said casing slots and the spheroidal outer surface of a tubular support 11¹ interposed between the heads 7² and 8².

When a vehicle provided with my device is propelled in a straight direction both the heads and axle parts are driven from the casing through the agency of the blocks which will engage by their teeth both of the heads to drive the latter as indicated by arrows $h$ in Fig. 10. Under such conditions there will occur no longitudinal movements to the blocks.

When turning a corner one of the traction wheels will rotate faster than the other with corresponding rotative movements of the associated heads, resulting in the blocks having imparted thereto reciprocatory longitudinal movements proportional to the speeds of the wheels.

For example, in Fig. 11, assuming the head 7² to be the faster moving one, the forwardly directed inclined faces of its teeth 9¹ acting upon the inclined faces of the adjacent teeth of blocks as 22¹, 22², will cause the same to be thrust in the direction denoted by arrows O on the referred to blocks until the teeth at the other ends of the blocks are brought, by the revolution of the latter, into sliding contact with the rear faces of the teeth 10¹ of the slower moving head 8² causing a reaction to occur to thrust such blocks toward the faster moving head, as indicated, for example, by arrow $o^1$ with respect to the block 22³ in Fig. 11, the direction arrows $h^1$ and $h^2$ for the heads in this view being shown to represent relative movements therebetween.

Another example of the action of the blocks when the vehicle is turning the corner is illustrated in Fig. 6 with respect to the embodiment of the invention as disclosed in Figs. 1 to 5, inclusive.

The invention and the manner of its operation will, it is thought, be understood from the foregoing description.

What I claim is—

1. In a differential apparatus, two axially alined angularly toothed driven elements arranged in spaced relation, a plurality of circumferentially arranged angularly toothed driving elements capable of independent axial movement and interposed between said elements, and means to revolve said driving members to cause the teeth thereof to coöperate with the teeth of said elements, said members when revolved in either direction being caused by said driving elements to reciprocate to afford differential rotary movement to said elements when the latter are unequally retarded.

2. In a differential apparatus, two axially alined driven elements, an annular support interposed between said elements to maintain the same in spaced relation, and a plurality of driving members arranged circumferentially around said support and independently movable axially of and between said elements, said elements and members having coacting teeth and said members being related to said elements and to each other so as to successively make toothed engagements with each of said elements when rotated relatively thereto, the teeth on said members and elements being provided with slide surfaces between which said engagements are made.

3. In differential apparatus, a rotatable casing, two axially alined elements mounted for relative rotary movement therein, an annular support encircling the axis of said elements between the latter and contained within said casing, and a series of blocks mounted on said support and secured to the casing to revolve therewith and arranged for relative axial movement, said blocks and elements having coöperating oppositely inclined faces for transmitting differential movement to said elements when the blocks are driven with the casing in either rotary direction.

4. In a differential apparatus, two opposing axle-head members provided with a plurality of teeth having angularly disposed slide faces, and a series of reciprocating blocks therebetween, said blocks having at their opposite ends angularly disposed slide cam faces, said blocks being held in definite positions relatively to each other and being capable of relative reciprocation so as to act on each axle-head member and thereby produce differential driving action when said axle-head members are unequally retarded.

5. In a differential apparatus, a rotatable casing, two driving toothed axle heads mounted therein, and driving connections between the casing and the axle-heads, said connections consisting of a plurality of blocks keyed to said casing for longitudinal reciprocatory movements and having teeth upon their opposite ends, said ends being alternately engageable with said toothed heads.

6. In a differential apparatus, a rotatable casing, two driven toothed elements mounted therein, and driving connections between the casing and the elements, said connections consisting in a plurality of blocks arranged concentrically about the axis of said toothed elements, said blocks having teeth upon their opposite ends and being alternately engageable with said toothed elements, the teeth in the ends of the various blocks being arranged in evenly spaced relations.

Signed at Seattle, Washington, this 11th day of February, 1918.

HARRY M. PATCH.

Witnesses:
    PIERRE BARNES,
    E. PETERSON.